March 2, 1948. L. H. DARLING 2,436,990
CARGO HOOK
Filed March 11, 1946

INVENTOR.
Louis H. Darling

BY Lancaster, Allwine & Rommel
ATTORNEYS.

Patented Mar. 2, 1948

2,436,990

UNITED STATES PATENT OFFICE 2,436,990

CARGO HOOK

Louis H. Darling, Vallejo, Calif., assignor to Fol-Gaf Limited, a partnership composed of Robert H. Allen, Lathrop, and Peter J. Wallace, Stockton, Calif.

Application March 11, 1946, Serial No. 653,538

4 Claims. (Cl. 294—26)

This invention relates to a cargo hook of the style used for grabbing bales, boxes and other heavy packages. Such hooks have a hand grip at the rear end of the shank of the hook and the hand grip extends transversely of the bill. Therefore when the hook is not in use and placed in a pocket it is difficult to insert and remove and in addition is liable to slip out of the pocket or cause injury to the workman or other workmen by the sharp bill cutting them.

Therefore, one object of the invention is to provide a cargo hook having its hand hold or grip so mounted that it may be turned about the shank from a position for use to a position in which it extends parallel to the bill and thus allow the hook to be placed in a pocket with its bill in such position that it will not project from the person or its grip project outwardly and cause the pocket to be torn and the bill turned to a position in which it projects outwardly.

Another object of the invention is to provide a cargo hook wherein its hand hold or grip may be readily turned from one position to another but will be firmly held against accidental turning.

Another object of the invention is to provide a cargo hook having its shank formed as upper and lower sections, the lower section being pivoted to the upper section so that the bill may be swung from an extended position for use to a folded position disposing its point close to the shank. It will thus be seen that by folding the hook it will be reduced in length and since it will then have a curved lower portion it may be very easily thrust into or withdrawn from a pocket and the sharp point of its bill will be shielded and prevented from catching in the pocket and cutting the workman.

Another object of the invention is to provide a cargo hook having its shank provided with a sleeve which is movable longitudinally thereof and also rotatable about the shank so that by adjusting the sleeve the lower portion of the shank may be firmly held in either an extended or folded position.

Another object of the invention is to provide a foldable cargo hook which is simple in construction, easy to adjust, and very strong.

The invention is illustrated in the accompanying drawings wherein.

Figure 1:
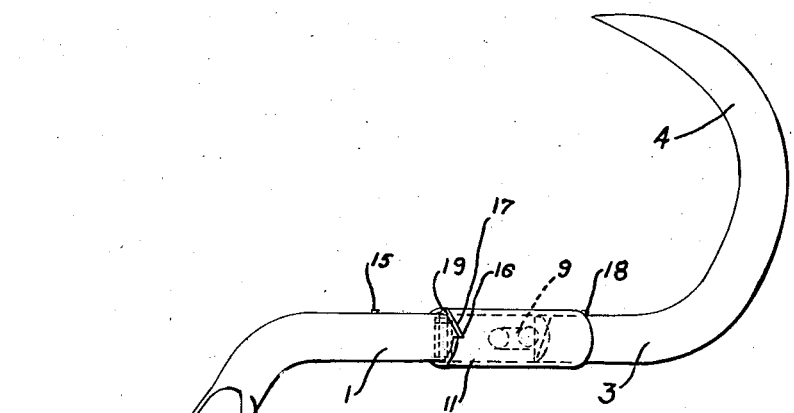
Figure 1 is a perspective view of the improved cargo hook ready for use.

This improved cargo hook has a shank 1, and a hand hold or grip 2, the grip or handle 2 being formed of wood or other suitable material, and the shank being formed of steel and having its end portion 3 pivoted to its handle portion 5 and bent to form a bill 4. The handle portion 5 of the shank is bent laterally so that it extends rearwardly and this rearwardly extending portion is flattened from opposite sides to provide a portion 6 which may be readily grasped and firmly held when the handle is to be turned from the position shown in Figure 1 to that of Figure 2.

Figure 2:
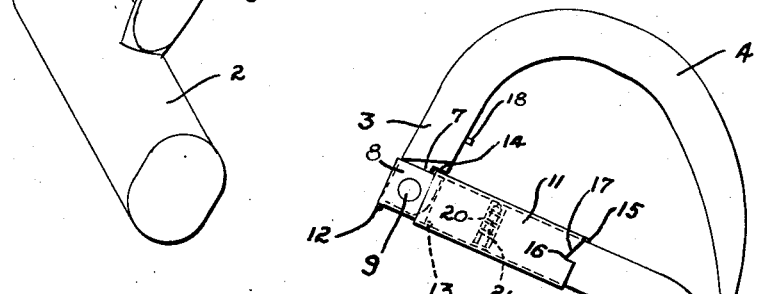
Figure 2 is a view in elevation showing the hook folded.
Figure 3:
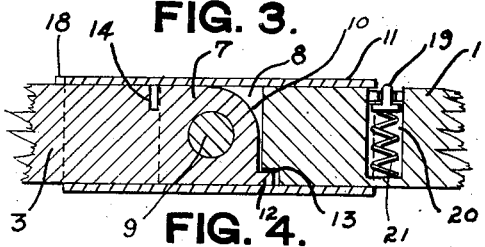
Figure 3 is a sectional view taken longitudinally of the shank with the sleeve in position to hold the bill extended.
Figure 4:
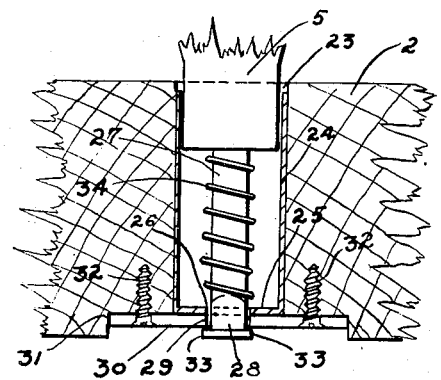
Figure 4 is a sectional view upon an enlarged scale taken longitudinally of the hand hold or grip.
Figure 4:
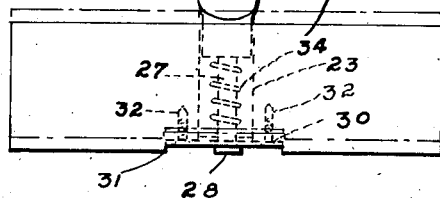

The handle end of portion 3 of the shank is reduced in thickness to form a hinge ear 7 which fits between hinge ears 8 of the portion 5 of the shank and is pivotally mounted by a pin 9 so that the bill may be swung from the extended position for use shown in Figure 1 to the folded position of Figure 2 in which the sharp point of the bill is disposed close against and is shielded by the bend of the handle portion of the shank. When the bill is in the folded position shown in Figure 2 it may be easily thrust into a pocket or withdrawn therefrom and since the point of the bill is shielded by the shank it will not be liable to catch in a pocket or cut a person. The portion 10 of the edge face of the ear 7 is curved in order that the bill may be swung to the folded or extended position without interference by contact with the sleeve 11 which fits snugly about the shank or contact with the portion of the shank between the ears 8 and at the opposite side of the ear 7 from the curved edge 10 there has been provided a tooth 12 which fits into a notch 13 formed on the end of the portion 5 of the shank 1 when the bill is in the extended position. At the side of the ear 7 opposite the tooth 12 there if formed a notch or groove 14 which extends transversely across the base of the ear and is of such dimensions that the lower edge of the sleeve 11 may be engaged in this notch when the bill is folded. A pin 15 projects from the shank to limit sliding movement of the sleeve 11 toward the handle 2, the sleeve being formed with a notch 16 having a sloping edge 17 so that after the sleeve has been shifted and the pin 15 engaged in the notch 16 the bill may be swung to the folded position and the sleeve then turned so that the pin moves along the sloping edge 17 of the notch and exerts a cam action to rotate the sleeve to a position in which its opposite edge engages in the groove 14 and locks the bill in the folded position, since the pin 15 will then engage the edge of the sleeve in spaced relation to the notch 16. When the bill is to be extended for use it is merely necessary to rotate the sleeve until the pin 15 may again enter th notch 16 and then shift the sleeve out of the groove 14 and swing the bill to the extended position. The sleeve is then slid toward the bill 4 until the outer end of the sleeve strikes the lug or pin 18 and since the hinge ears will be disposed within the sleeve the bill will be held in an extended position for use.

When the sleeve 11 has been slid along the shank into contact with pin 18 it uncovers a spring loaded plunger 19 which is mounted in a socket 20 formed in the shank 1. The plunger 19, after being uncovered by the movement of the sleeve 11, is urged outwardly by a spring and constitutes a spring latch to retain the sleeve so as to lock the bill in the extended position for use, as shown in Figure 1 of the drawing. When it is desired to again fold the hook, the sleeve 11 is rotated so as to cause the plunger 19 to enter the notch 16 and then by applying a slight rotary force to the sleeve, in the direction of the handle 2, the sleeve may be slid across the rounded top of the plunger 19 to the position required for folding and locking as stated above.

The handle or hand grip 2 is formed midway its length with a bore or socket 23 to receive the rear end of the shank 1 and in this socket is a sleeve or liner 24 having a head 25 at its rear end through which an opening 26 is formed. The rear end of the shank is formed with a cylindrical stem 27 having a rectangular head 28 at its end which passes through a correspondingly shaped opening 29 formed in a plate 30. This plate is seated in a recess 31 formed in the handle and is secured by screws 32. The metal of the outer end of the head 28 is upset or expanded, after assembly of the handle and shank, to form a lip or flange 33 which is a little larger than the rectangular shaped opening 29 formed in the plate 30. In this manner the handle and shank are secured in operative relation and against separation by pressure of the spring 34 which is coiled about the stem 27 with its inner end engaging the shank and its outer end abutting the head 25 of the sleeve 24. The stem 27 is circular in cross section between the head 28 and its inner end and therefore when the handle is pressed forwardly to move the head outwardly through the opening 29 the handle may be turned about the stem and the shank to the position for use shown in Figure 1 or to the position shown in Figure 2 in which it extends parallel to the folded bill. When pressure upon the handle is released the spring shifts the handle rearwardly and the square head 28 again enters the square opening 29 and firmly holds the handle in the adjusted position. When the handle and the bill are in the position shown in Figure 1 the cargo hook may be used in the usual manner and when they are moved to the position shown in Figure 2 the cargo hook may be conveniently carried in a pocket and since it fits close against a person it will not tear the pocket or be liable to cut a person.

Having thus described the invention, what is claimed is:

1. In a foldable cargo hook, a shank comprising a handle portion, bent laterally intermediate its length to provide a substantially straight end portion-attached section and a handle-carrying section, and an end portion having a handle portion-attaching, substantially straight end section, and an arcuate, bill-carrying section, means pivoting said portions together at the end of each of said straight sections so that when said hook is folded the point of said bill will contact said handle portion at the bend thereof, and the longitudinal axes of said straight sections will form substantially a right angle.

2. In a foldable cargo hook, a shank comprising a handle portion, bent laterally intermediate its length to provide a substantially straight end portion-attached section and a handle-carrying section provided with a handle, an end portion having a handle portion-attaching, substantially straight end section, and an arcuate, bill-carrying section, means pivoting said portions together at the end of each of said straight sections so that when said hook is folded the point of said bill will contact said handle portion at the bend thereof, the longitudinal axes of said straight sections will form substantially a right angle, and said end portion-attached section between said bill-carrying section and said handle will be spaced from said handle throughout its length.

3. A cargo hook including a shank having a bill at its front end, said shank having a main section and a forward section, the said sections having hinge ears at their adjoining ends, a pin passing through said ears and pivotally connecting the sections for swinging movement of the bill from an extended position for use to a folded position, a sleeve slidable along said shank into and out of position to engage about the hinge ears and hold the bill in its extended position, and the hinge ear of the forward shank section being formed with a recess for receiving the front edge of the sleeve and holding the bill folded.

4. A cargo hook including a shank having a bill at its front end, said shank having a main section and a forward section hinged to the front end of the main section for swinging movement of the bill from an extended position to a folded position disposing the sharp point of the bill close to the shank, a sleeve slidable along said shank into and out of position to engage about the hinge joint and hold the bill extended, upper and lower pins for limiting sliding of the sleeve, the forward section of the shank being formed with a transverse groove at the hinge joint to receive the front edge of the sleeve and secure the bill in its folded position, and the upper end of the sleeve being formed with a notch for receiving the upper pin and permitting upward movement of the sleeve to a position displacing the lower edge of the sleeve from the transverse groove and allowing movement of the bill to its extended position.

LOUIS H. DARLING.

REFERENCES CITED

The following references are of record in the file of this patent:

UNITED STATES PATENTS

| Number | Name | Date |
|---|---|---|
| 580,949 | Murphy | Apr. 20, 1897 |
| 895,126 | Thompson | Aug. 4, 1908 |
| 1,640,102 | Valliere | Aug. 23, 1927 |